April 25, 1944.   M. N. YARDENY   2,347,531
BLACKOUT FLASHLIGHT ATTACHMENT
Filed March 11, 1942   2 Sheets-Sheet 1
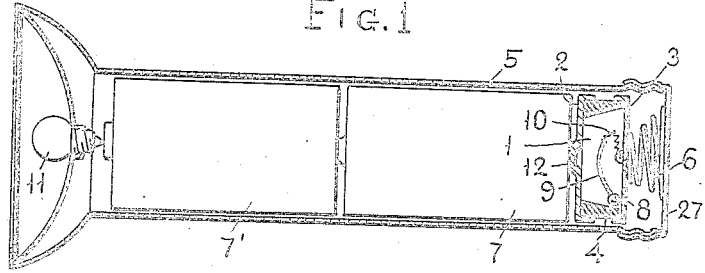
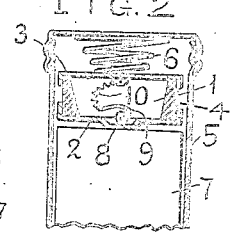
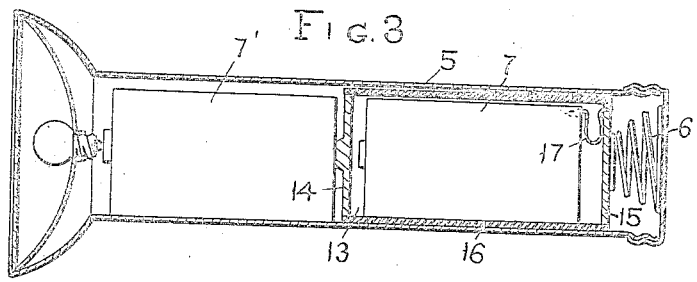
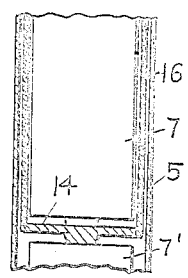
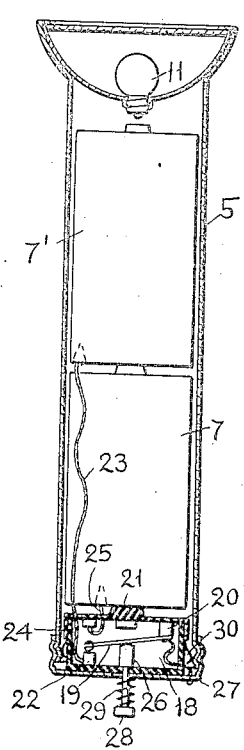
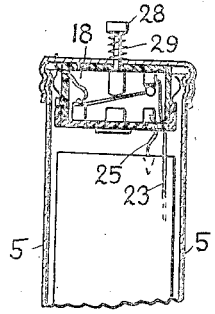
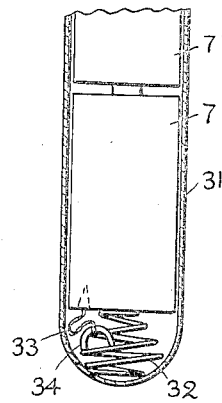
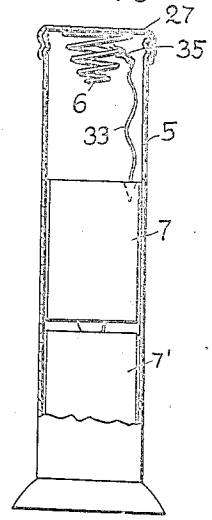
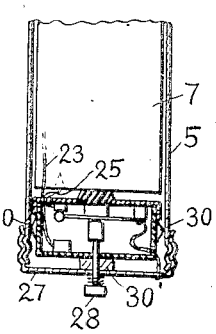
MICHEL N. YARDENY
INVENTOR.
BY John P. Wilcoxon
ATTORNEY April 25, 1944.    M. N. YARDENY    2,347,531
BLACKOUT FLASHLIGHT ATTACHMENT
Filed March 11, 1942    2 Sheets-Sheet 2
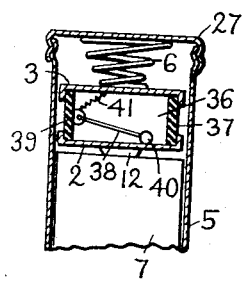
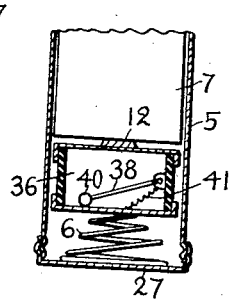
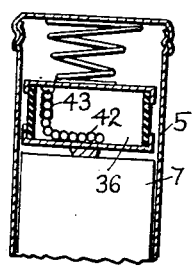
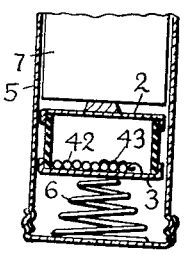
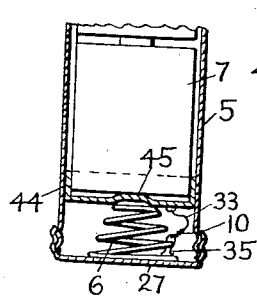
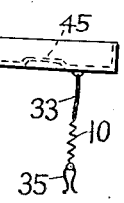
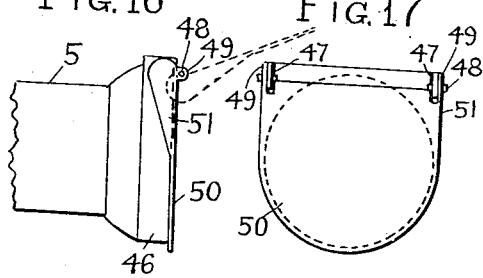
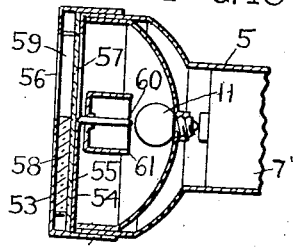
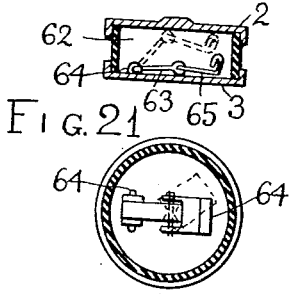
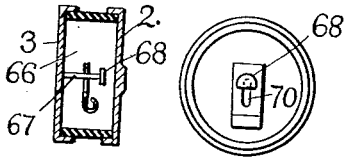
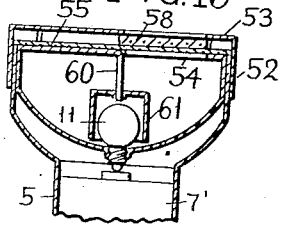
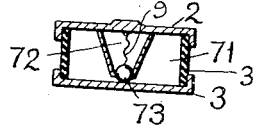
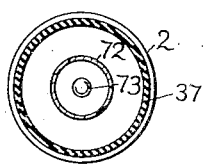
MICHEL N. YARDENY
INVENTOR.
BY John P. Wissonow
ATTORNEY Patented Apr. 25, 1944

2,347,531

UNITED STATES PATENT OFFICE 2,347,531

BLACK-OUT FLASHLIGHT ATTACHMENT

Michel N. Yardeny, New York, N. Y., assignor to American Type Founders, Incorporated, Elizabeth, N. J., a corporation of New Jersey Application March 11, 1942, Serial No. 434,199

3 Claims. (Cl. 200—60)

My invention relates to blackout flashlight attachments and has particular reference to attachments for converting ordinary flashlights into blackout flashlights.

In my United States patent applications Serial No. 423,703, filed December 20, 1941, and Serial No. 429,446, filed February 4, 1942, I have described certain types of flashlight attachments. The object of my present invention is to provide an attachment or fixture which can be applied to a flashlight casing in such a manner as to be included in a lamp circuit and which comprises a gravity-operated switch for disconnecting the circuit when the flashlight is turned upward or is placed in an approximately horizontal position.

In a modified form of my attachment I provide a rigid shell for one of the battery cells in the flashlight, the cell freely sliding by gravity in the shell so as to close the circuit when the flashlight is turned downward and to disconnect the circuit when the flashlight is turned upward.

In another modification of my attachment I provide a manually operable switch for selectively connecting one or more battery cells for varying the intensity of light, means also being provided for disconnecting the circuit when the flashlight is turned upward.

In another modification I provide a freely sliding battery cell with a detachable flexible connector for one of its electrodes, the cell serving as a gravity switch. A resistance element may be included in the lamp circuit for dimming the light.

In still another modification I provide an attachment in the form of a detachable cap for the front end of the flashlight, the cap having a hinged lid for darkening the light, the lid being held by friction in an open or closed position.

In another form of the cup-shaped attachment I provide a plate of colored glass sliding by gravity in a pocket in the cap, so that the colored beam of light can be obtained by merely turning the flashlight to one side. I also provide a dimming cap so positioned in the attachment that the lamp bulb is fully covered and darkened when the flashlight is turned upward.

My invention is more fully described in the accompanying specification and drawings, in which:

Fig. 1 is a sectional view of my attachment inserted in a flashlight casing, the latter being shown in a horizontal position with the lamp switch opened;

Fig. 2 is a fractional view of the same, the flashlight being turned downward and the switch closed;

Figs. 3 and 4 are similar views of a modified attachment in which the battery cell itself acts as a gravity switch;

Fig. 5 is a sectional view of a modified attachment inserted in a flashlight casing, the attachment having a manually operable switch and an automatic gravity circuit disconnecting device;

Fig. 6 is a fractional view of the same showing the circuit automatically connected, the flashlight being turned downward;

Fig. 7 is a similar view of a modified switch;

Figs. 8 and 9 are similar views of a modified attachment, in which a battery cell is used as an automatic switch;

Figs. 10 and 11 are fractional sectional views of a modified attachment inserted in a flashlight casing;

Figs. 12 and 13 are similar views of another modification;

Fig. 14 is a view of a detachable fixture for a battery cell, whereby the cell is made to operate as a gravity switch;

Fig. 15 is a detail view of the fixture shown assembled in Fig. 14;

Figs. 16 and 17 are views of an attachment for the front end of the flashlight with a hinged dimming lid;

Figs. 18 and 19 are views of another type of an attachment for the front end of the flashlight;

Figs. 20 and 21 are detail views of a modified automatic switch;

Figs. 22 and 23 are detail views of a modified automatic switch;

Figs. 24 and 25 are detail views of another modification of the automatic switch; and Fig. 26 is a detail view of still another modification.

My attachment, as shown in Figs. 1 and 2, consists of a capsule or container 1 formed of metal top and bottom plates 2 and 3, respectively, with peripheral flanges engaging a cylindrical tubular portion 4 made of an insulating material. The capsule is placed inside a flashlight housing 5 between a bottom spring 6 and a battery cell 7.

The capsule, therefore, provides a break in a lamp circuit of the flashlight. For closing the circuit, an automatic gravity switch is provided in the capsule consisting of a metal ball 8 held on a conducting flexible cable 9 attached at the other end to the bottom plate 3. A resistance element 10 may form a portion of the cable for permanently dimming the light. The inside walls of the tubular member 4 may be tapering or converging toward the top plate 2, in order to cause the ball 8 to slide toward the bottom plate when the flashlight is held in a horizontal position, as shown in Fig. 1. The lamp circuit will then be broken but will be reestablished when the flashlight is turned downward, as shown in Fig. 2, causing the ball 8 to rest on the top plate 2.

It is evident that the switch capsule 1 may be also placed between two consecutive battery cells or even between the top cell and a lamp bulb 11. The top plate 2 may be provided with a projection 12 to insure a good contact surface.

A modified attachment is shown in Figs. 3 and 4. One of the cells 7 is placed in a container or shell 13 having metal top and bottom plates 14 and 15 respectively, the top plate having a contact projection 12, and mounted at the ends of an insulation tube 16. The shell is longer inside than the battery cell 7, so that the latter can slide up and down in the shell. A conducting flexible cable or cord 17 connects the metal casing of the battery cell with the bottom plate 15. The cell 7 slides down by gravity when the flashlight is turned upward, thereby breaking the lamp circuit. The circuit remains broken when the flashlight is placed in a horizontal position, as shown in Fig. 3, and remains broken when it is turned upward as shown in Fig. 4.

Another attachment is shown in Figs. 5 and 6 and consists of a capsule 18 placed at the bottom of the flashlight casing 5. The capsule may be made of an insulating material and is provided inside with a switch arm 19 mounted on a post 20 electrically connected with a contact button or projection 21 on the capsule engaging the bottom of the cell 7. The arm resiliently presses against a contact block 22 connected by a flexible lead 23 with an upper cell 7'. A second contact block 24 is mounted on the upper wall of the capsule and is connected by a flexible lead 25 with the bottom battery cell 7. A plunger 26 is slidably fitted in the bottom wall of the capsule, passing also through a cap 27 of the flashlight casing 5. The exposed portion of the plunger has a thumbhead 28 and a spring 29, urging the plunger outward. Normally the switch arm 19 contacts the block 22, so that only one cell 7' is connected in a circuit with the lamp, the light being thereby dimmed. Moreover, with the flashlight turned upward, as shown in Fig. 5, the circuit is interrupted because the battery cells slide down, away from contact with the lamp bulb 11. The circuit is closed when the flashlight is turned downward, as shown in Fig. 6, because both cells are connected by flexible leads with the switch in the capsule 18.

The capsule has friction springs 30 at the sides, causing the capsule to remain in its position at the bottom of the casing 5. By pushing the plunger 26 inward, the switch arm 19 is moved into engagement with the contact block 24, thereby connecting also the bottom cell 7 with the lamp circuit for obtaining bright light. By pressing still harder on the thumbhead 28, the whole capsule 18 is moved against the cells, thereby closing the lamp circuit in any position of the flashlight, as shown in Fig. 7. A spacer 30' may be provided between the capsule and cap 27. By screwing the cap 27 farther in, the circuit can be closed for any position of the flashlight.

Another type of attachment is shown in Fig. 8, especially made for a streamlined type of flashlight casing 31 having a steel spring 32 at the bottom. The bottom cell 7 is provided with a flexible connector 33 with a magnet 34 at the end. The magnet attaches itself to the spring, establishing an electric connection for the cell. The cell can slide up and down as in other attachments for connecting and disconnecting the circuit.

In an attachment shown in Fig. 9, the cell 7 has also a flexible connector 33, but instead of the magnet, it has a spring clamp 35 engaging a spring 6 extending from the bottom cap 27.

With these devices, in order to provide freedom of movement for the cells, fewer cells than normal can be used. Thus, with an ordinary three-cell flashlight, one cell may be removed, using two cells only.

In a modification shown in Figs. 10 and 11, a capsule 36 is provided with top and bottom plates 2 and 3 respectively separated by a tubular insulation member 37. A conducting pendulum 38 is pivotally supported at 39 on the insulation wall and has a ball 40 at the end, engaging top or bottom plates of the capsule, depending on the position of the flashlight. The pivoted end of the pendulum is connected by a resistance element 41 with the bottom plate 3.

In a modified device shown in Figs. 12 and 13, the pendulum is replaced by a metal chain 42 attached at one end to the bottom plate 3, the other end being free to rest on the top plate when the flashlight is turned downward. The attached portion of the chain may be lacquered at 43 or otherwise insulated.

A simplified fixture is shown in Figs. 14 and 15 for use with flashlight normally made with three cells. One cell is removed, as in the flashlight shown in Figs. 8 and 9, leaving the other cells free to slide up and down in the casing 5. A metal cap 44 with a central projection 45 is frictionally fitted in the end of the cell 7, the projection engaging the metal bottom of the cell. A flexible lead 33 is attached at one end to the cap 44, the other end having a spring clamp 35 engaging the spring 6 in the cap 27. A resistance element 10 may be introduced into the lead 33 for permanently dimming the light.

A non-automatic dimming attachment is shown in Figs. 16 and 17. It consists of a collar 46 frictionally or otherwise attached to the front end of a flashlight casing 5. The collar has lugs 47 pivotally connected at 48 with corresponding lugs 49 on a lid 50. The latter has cheeks 51, frictionally engaging corresponding flat extensions at the sides of the collar 46. The lid can be turned into an open or closed position, remaining in the particular position by friction between the cheeks 51 and the sides of the collar.

Another attachment for the front end of the flashlight is shown in Figs. 18 and 19, consisting of a cap 52, frictionally fitted on the front end of the casing 5. The cap has an outer wall 53 and an inner wall 54, the latter supporting a transparent plate 55 made of glass or other transparent material. The walls 53 and 54 have windows 56 and 57 opposite each other and covering about one half of the front area of the front end of the flashlight. A plate 58 made of a colored glass slides in a space 59 between the outer wall 53 and glass plate 55. By turning the flashlight to one side or the other, the plate 58 can be made to fall into the space between the windows, so that a beam of colored light will be obtained. This position is shown in Fig. 18. In another position the plate 58 will fall into an opaque pocket, so that white light will be emitted as shown in Fig. 19.

The inner wall 54 has a rod 60 which extends toward the lamp bulb 11. An opaque cap 61 slides on the rod 60 and covers the bulb when the flashlight is turned upward, as shown in Fig. 19, entirely shutting off the light from the bulb 11.

A modified switch capsule 62 is shown in Figs. 20 and 21. A short pendulum 63 is pivoted at 64 to the bottom plate 3 and is pivotally connected at the end with a contact link 65. The pivoted connection 64 has wide bearings, so that the link 65 is free to swing in a plane at right angles to the plane of movement of the pendulum, as shown in dotted lines in Fig. 21.

In a capsule 66, Figs. 22 and 23, the bottom plate 3 has a post 67 with a head 68 supporting a contact link 69. The link has a slot 70 for the post 67 and is so arranged that it touches the plate 2 when the flashlight is turned downward at a certain angle, no contact being made when the flashlight is in a horizontal position or turned upward.

In a capsule 71, Figs. 24 and 25, the upper plate 2 has a frusto-conical tube 72 for a contact ball 73. The opening at the end of the tube is smaller than the ball and is so positioned that the ball closes the lamp circuit when the flashlight is inclined downward at a certain angle.

In a capsule 74, Fig. 26, a bracket 75 is mounted on the bottom plate 3, pivotally supporting a contact pendulum 76. The latter is bent and so positioned that the contact is closed when the flashlight is tilted downward at a certain angle, the circuit being open when the flashlight is placed in a horizontal position or tilted upward.

It is understood that my blackout flashlight attachment may be further modified without departing from the spirit of the invention, as set forth in the appended claims.

It is understood that a moisture-absorbing and oxidation preventing chemical may be added into the capsule, such as calcium chloride, etc.

I claim as my invention:

1. A switch comprising a container having opposite walls comprising portions made of metal insulated from each other; a metal pin extending inwardly from one of the walls, a metal pendulum for rotation in a plane transversed to the pin supported on the pin; and an enlargement at the end of the pin retaining the pendulum, the pendulum being adapted to engage the opposite wall when the container is inclined in a corresponding direction.

2. A switch comprising a container having opposite walls comprising portions made of metal insulated from each other; a metal pin extending inwardly from one of the walls, a metal pendulum for rotation in a plane transversed to the pin supported on the pin, the pendulum being adapted to engage the opposite wall when the container is inclined in a corresponding direction.

3. A switch comprising a container having opposite walls comprising portions made of metal insulated from each other; a metal pin extending inwardly from one of the walls, a metal pendulum rotatively and slidably supported on the pin; and an enlargement at the end of the pin for retaining the pendulum and the pin when the pendulum slides to the opposite wall when the container is inclined in a corresponding direction.

MICHEL N. YARDENY.